Patented Oct. 15, 1935

2,017,318

UNITED STATES PATENT OFFICE 2,017,318

METHOD FOR TREATING GLAZED CERAMIC WARE

William McCoy, Zanesville, Ohio

No Drawing. Application October 6, 1931,
Serial No. 567,305

15 Claims. (Cl. 91—68)

This invention relates to a process for treating glazed ceramic ware for the purpose of preventing, reducing and delaying the tendency of the glazed surfaces of such ware to craze when placed in walls or when in actual use.

Crazing is a characteristic defect which frequently develops in most glazed ceramic products and is the result of fine minute cracks, fissures or fractures which take place in the glasslike coating comprising the glaze. Crazing, in general, is regarded as an imperfection and attributable to faulty manufacture, and it has been the endeavor of the ceramic industry to overcome or minimize this condition by the use of carefully selected materials in both the body and the glaze so that the coefficients of expansion and contraction of such materials will be as uniform as possible, all adjustments and corrections in the matter of material proportions, mixing and application being previously made before the final kiln treatment and consequent final completion of the product, but, so far as I am aware, no attempt has been made to treat kiln fired glazed ware following final manufacture to prevent or inhibit crazing.

It is known in the industry that the placing of glazed ceramic ware in juxtaposition with cement, concrete or other similar moisture containing cementitious materials has the effect of promoting and increasing the tendency of such glazed ware to craze. I have observed that glazed tile when placed in a wall adjacent to a cement backing has quickly and widely crazed, whereas corresponding tile of the same manufacture produced from the same materials and at the same time under identical manufacturing conditions, when not placed in such a wall or in contact with moisture containing bodies has kept its condition and remained uncrazed following long periods of storage. In the building of glazed tile walls, for example, the contractor is at a loss to prevent craizng since often after such a tile wall has been erected, the glazed surfaces of the tile will in a short time crack or craze to such an extent as to be decidedly visible when the fine hair line fractures in the glazed surfaces accumulate foreign matter of a contrastingly different color. This results in rejected work, the removal of such undesirable glazed walls and added costs in the matter of both materials and labor. Under such circumstances, the contractor or tile setter has been helpless to guard against the hazards and expense of crazing and has been a victim of uncontrolled conditions, both on the part of the tile manufacturer and tile setter.

It is therefore one of the outstanding objects of the present invention to provide a method as well as a novel preparation for treating glazed kiln fired ceramic ware so that at the time of the setting of such ware in walls, the said ware may be treated in a simple and economical manner so that the tendency of the tile to craze will be greatly minimized over prior practice and losses due to such crazing correspondingly reduced.

While my process is applicable to all glazed ceramic products, it is particularly useful in clay products such as tile, terra cotta, glazed brick, structural tile and other glazed ceramic products designed for structural purposes.

In carrying out my process in one of its preferred adaptations, I use a standard commercial grade of barium chloride ($BaCl_2$—$2H_2O$) as the basis of my compound, since it is an easily obtained material, low in price, readily soluble in water, positive in action, does not destroy the adhesive quality of the cement, does not discolor the materials treated, nor is it harmful to the human skin. With this substance, I produce an aqueous solution wherein the barium chloride is present in quantities ranging from .50% to 20.00% by weight of the water of the solution. I then immerse the glazed ceramic ware to be treated in this solution so that the latter will be absorbed to an extent depending upon the absorptive properties of the ware. The period of immersion varies with the ware undergoing treatment and is governed largely by the absorptive properties of the latter, but in any event, it is my purpose in carrying out this operation to enable the treating solution to thoroughly penetrate as uniformly as possible the body of the ware so that the barium chloride will be deposited in the pores, cells, or interstices of the clay body of such ware.

I am aware of the fact that in the case of glazed tiles and other glazed ceramic products used in the building industry, especially in connection with juxtaposed cement and concrete backing walls and foundations, it has been customary to soak these glazed materials thoroughly in water before setting the same in place with mortar in the building structure, the soaking water being used to prevent too rapid dehydration of the cement. This preliminary soaking is a well known expedient in installing glazed ceramic products, especially those having an appreciable capacity for water absorption, such as semi-vitreous glazed wall tiles. However, this customary soaking operation takes place merely with water for a totally different purpose than that of the present invention and has no beneficial effect whatever in preventing the tendency of the tile so treated to craze. I have found that by adding barium chloride and/or its equivalent to the soaking water, a dual function is obtained, to wit, too rapid dehydration of the cement is prevented and likewise the tendency of the tile to craze. The time of soaking, as stated, is usually dependent on the nature of the material used, but generally care is exercised to make certain that a sufficient period of time shall be allowed to permit all pores in the product to be filled with the treating fluid. When this is done, the treated products may then be placed in wall formation by the following customary procedure.

It has been found that the necessary concentration of the solution, comprising the present invention, depends upon the absorptive qualities of the glazed tiles to be treated. The tile as it is soaking absorbs a certain amount of the solution during the soaking treatment, thereby incorporating a proportional amount of the treating compound into the body of the tile, which remains as a part thereof.

It is to be understood that my invention is to be in no way limited to any one specified concentration of the compound employed, since it has been above set forth that this concentration is dependent upon the absorptive qualities of the material to be treated. The amount of the compound used or the concentration thereof is also governed by the molecular weight and solubility of the composition of the compound, which ranges generally from .50% to 20.00% by weight of the soaking water.

The purpose of the introduction of the barium chloride into the tile is to neutralize or counteract external or internal forces or a combination of such forces, which are caused by chemical or physical reactions, or both, between the cement comprising the backing and the glazed tile, which forces or reactions result in changes between the body and the glaze of the product and which apparently are the cause of crazing. It will be appreciated that my invention not only includes the use of barium chloride as herein described but the use of equivalent compounds possessing like properties. Among these, which I have found will also produce results similar to barium chloride in the capacity set forth are: barium carbonate, magnesium chloride, calcium chloride, stannous chloride, hydrochloric acid, nitric acid, oxalic acid, acetic acid, and/or picric acid. These compounds may be used separately in the treating solution or, if desired, may be employed in various selected combinations.

My process is not to be limited, however, to the use of materials which are water soluble and which must be used in connection with the soaking water, since I have found it possible to introduce the required treating materials into the glazed clay ware by the use of treating materials in both gaseous and solid states. These treating materials may be introduced into the clay ware as emulsions, liquids, vapors and/or mechanical mixtures, or in any other form or state which lends itself readily and conveniently to the specific treatment which may be required for any individual clay product.

I have also found it possible to introduce the treating compound as a solid directly into the cement backing, or it may be sprinkled on the surface of the setting bed before the glazed tile is applied, or upon the back of the tile itself, the moisture in the mortar thus carrying my compound into the tile as the cement dries and sets.

It should be further understood that I may introduce my compound into the glazed ceramic ware in the form of an emulsion or a colloidal suspension. In this manner it is possible to make use of craze inhibiting materials which are not soluble in water and could not be readily introduced into the soaking water to form a solution therewith. Thus I may use a very finely divided compound and form the same into either an emulsion or a colloidal suspension, after which it may then be added to the soaking water and used in the same manner as heretofore described.

When an insoluble material such as barium carbonate is used, I may add it to the soaking bath which will be constantly stirred or agitated to prevent the treating material from settling, and thus allow the same to be absorbed by the ceramic product in a manner similar to that used with a soluble compound.

When introducing the treating material into the ware in the form of a gas, I prefer to use a gas tight chamber of such size that the ceramic products may be contained therein. This chamber may be equipped with gas tight doors and with gas inlets and outlets, thereby rendering it possible to introduce the required amount of a gasified compound under a sufficient pressure to penetrate the pores of the ceramic articles to be treated. This method is especially adapted to products which do not lend themselves readily to soaking, the time required for treatment varying with the porosity of the ware, the ease of impregnation and the particular form of gas and pressure used.

The processes herein described are also applicable to sanitary ware, pottery, semi-porcelain and like ceramic products having a glazed coating, my invention residing in fully and uniformly impregnating the body of the ware with compounds of the type specified in order to prevent crazing.

What is claimed is:

1. The method of treating finished glazed ceramic ware which consists in incorporating in such ware after the same has been kiln-fired an inorganic salt having the property of inhibiting crazing of the glazed surfaces of the ware when the latter is in juxtaposition to a moisture containing body.

2. A process of inhibiting crazing of kiln fired glazed ceramic ware, which resides in subjecting the ware to the action of a deliquescent inorganic compound capable of inhibiting crazing in an aqueous solution whereby said compound is substantially uniformly impregnated throughout the body of the ware.

3. The method of inhibiting glaze crazing of ceramic ware, which consists in subjecting such glazed ware to the action of barium chloride in aqueous solution.

4. The process of inhibiting glaze crazing in finished kiln treated ceramic ware, which consists in subjecting such ware to the action of barium chloride in aqueous solution by immersing the ware in said solution to permit the latter to uniformly impregnate the body of the ware.

5. The process of inhibiting glaze crazing in finished kiln treated ceramic ware, which consists in subjecting such ware to the action of barium chloride in aqueous solution by immersing the ware in said solution to permit the latter to uniformly impregnate the body of the ware and then placing the ware following removal thereof from the solution in juxtaposition to a cementitious water-containing base.

6. A glazed kiln fired ceramic body impregnated with barium chloride throughout the internal mass thereof.

7. The process of inhibiting glaze crazing of ceramic ware, which resides in incorporating barium chloride in the body of such ware when the same is used in juxtaposition to a moisture containing cementitious base.

8. The method of treating ceramic ware, which consists in incorporating in such ware following kiln treatment thereof an extraneously added inorganic salt capable of inhibiting crazing in such manner that said salt is substantially uniformly distributed throughout the body of the ware.

9. The method of treating finished kiln-fired glazed ceramic ware, which consists in placing such ware in contact with a cementitious moisture-containing base, and in incorporating in the finished ware an extraneously added salt compound having the effect of inhibiting crazing on the part of the glazed surface or surfaces of the ware when such ware is in contact with the cementitious base.

10. The method of treating finished glazed ceramic ware which consists in permeating the pores and interstitial spaces of such ware following kiln treatment thereof with a craze-inhibiting compound, the said compound being primarily effective when the ware is placed in direct contact with a moisture-containing cementitious body.

11. The method of inhibiting crazing of kiln-fired glazed ceramic ware, which consists in immersing the finished ware in a bath containing an inorganic salt in solution or suspension capable of inhibiting crazing, and retaining the ware in said bath for a sufficient period of time to permit the ware to absorb the salt and to permeate the body thereof to a desired degree.

12. The process of inhibiting crazing of fired glazed ceramic ware which consists in impregnating the body of such ware after firing with at least one compound selected from a group composed of barium chloride, barium carbonate, magnesium chloride, calcium chloride, stannous chloride, hydrochloric acid, nitric acid, oxalic acid, acetic acid and picric acid.

13. The method of treating finished glazed ceramic ware which consists in permeating the pores and interstitial spaces of such ware following kiln treatment thereof with at least one craze-inhibiting compound selected from the group composed of barium chloride, barium carbonate, magnesium chloride, calcium chloride, stannous chloride, hydrochloric acid, nitric acid, oxalic acid, acetic acid and picric acid; said permeation being accomplished by introducing the said compounds into cementitious backing to which the glazed ware is applied.

14. The method of inhibiting crazing of kiln-fired glazed ceramic ware, which comprises immersing the finished ware in a bath containing a craze inhibiting compound in solution or suspension, and retaining the ware in said bath for a sufficient period of time to permit the ware to absorb the compound and to permeate the body to the desired degree.

15. The method of inhibiting crazing in finished kiln-fired glazed ceramic ware adapted to be joined to cementitious backing, which comprises incorporating in said cementitious backing a craze inhibiting compound, and then joining said ceramic ware thereto.

WILLIAM McCOY.